Dec. 18, 1951 C. L. JEFFERS 2,579,001

ELECTRONIC SWITCHING DEVICE

Filed May 26, 1947 3 Sheets-Sheet 1

INVENTOR
Charles L. Jeffers

BY Ralph B. Stewart

ATTORNEY

Dec. 18, 1951 C. L. JEFFERS 2,579,001

ELECTRONIC SWITCHING DEVICE

Filed May 26, 1947 3 Sheets-Sheet 2

INVENTOR
Charles L. Jeffers
BY Ralph B. Stewart
ATTORNEY

Dec. 18, 1951

C. L. JEFFERS 2,579,001

ELECTRONIC SWITCHING DEVICE

Filed May 26, 1947

3 Sheets-Sheet 3

INVENTOR
Charles L. Jeffers
BY Ralph B. Stewart
ATTORNEY

Patented Dec. 18, 1951 2,579,001

UNITED STATES PATENT OFFICE 2,579,001

ELECTRONIC SWITCHING DEVICE

Charles L. Jeffers, San Antonio, Tex.

Application May 26, 1947, Serial No. 750,487

14 Claims. (Cl. 250—27)

This invention relates to an electronic switching device and more particularly to a method and means for automatically producing control voltages proportional to the relative strength of two compared energy sources.

More particularly, my device is designed to generate a direct current potential difference proportionate to the amount of unbalance between two compared input voltages. The potential difference so generated may be used in a variety of useful ways, such as for instance to disconnect the source of the weaker input voltage from a utilization channel, or it may be used to adjust the input voltage sources to restore balance.

Figure 1:
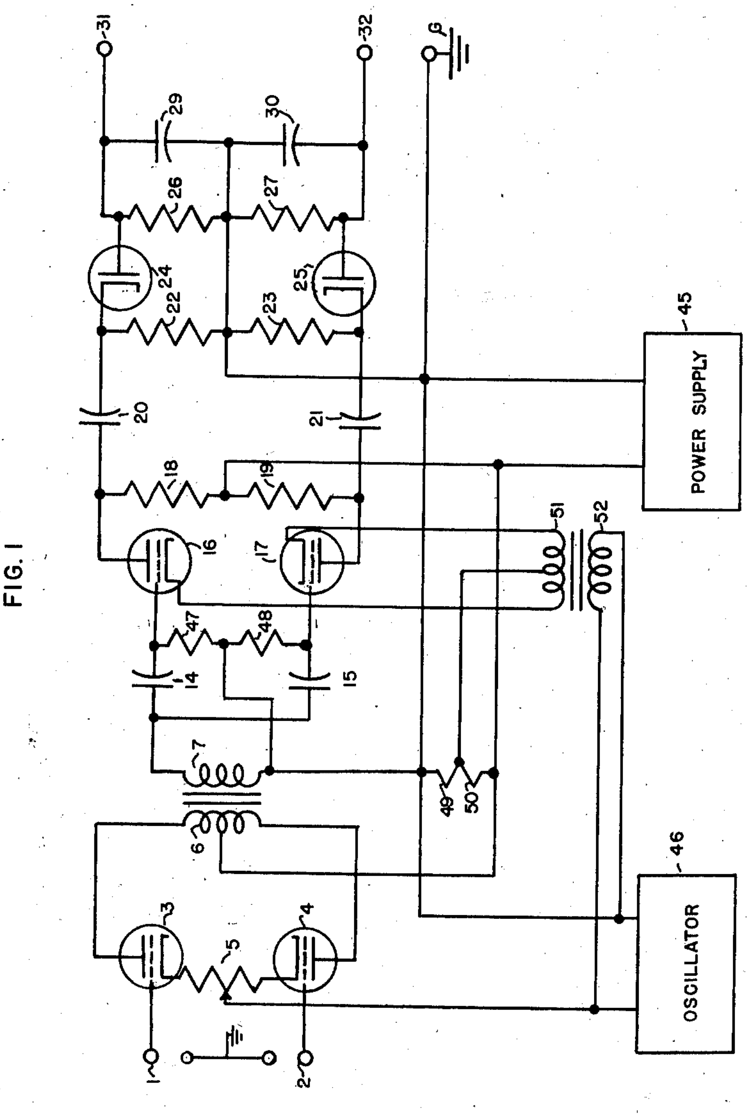
Figure 2:
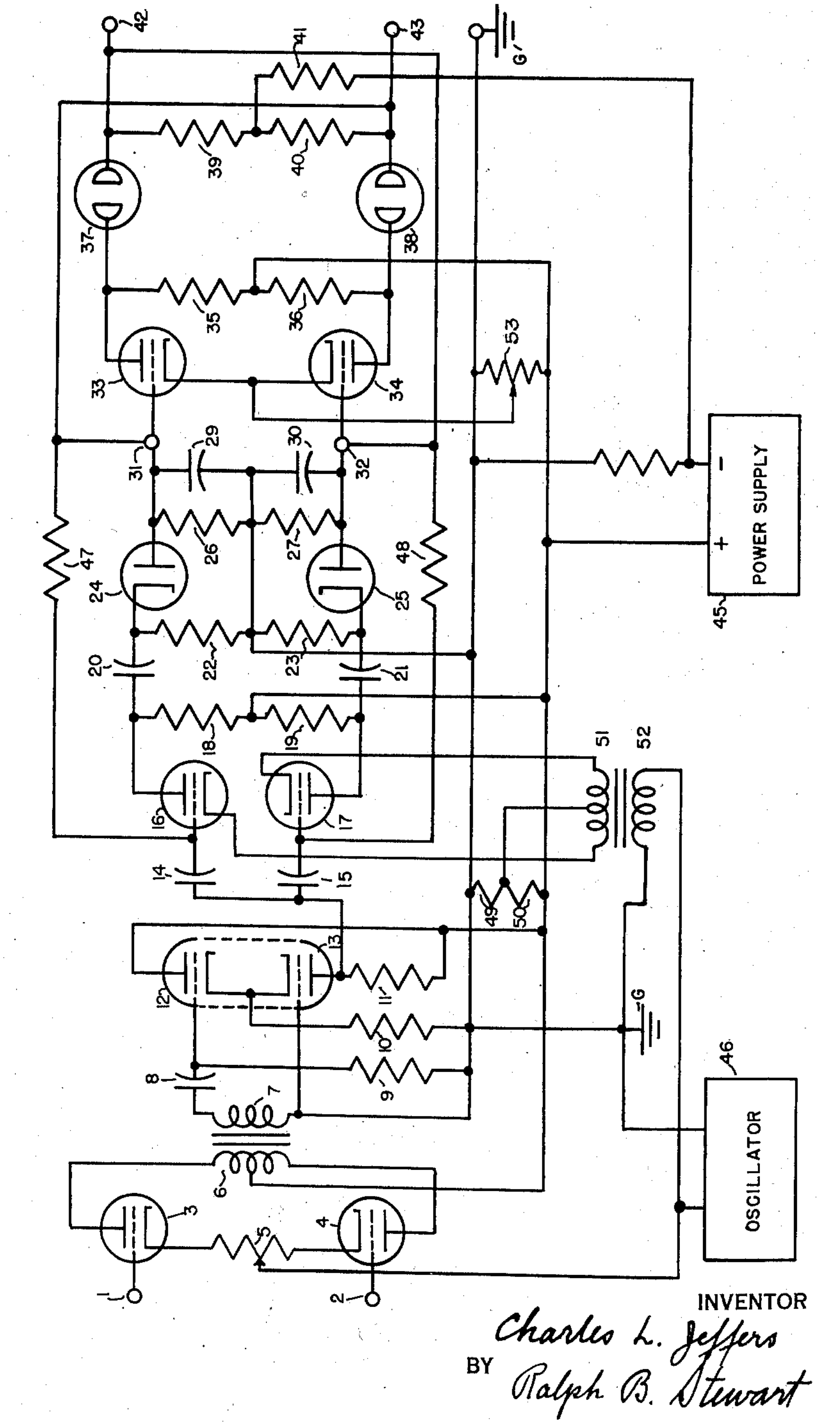
Figure 3:
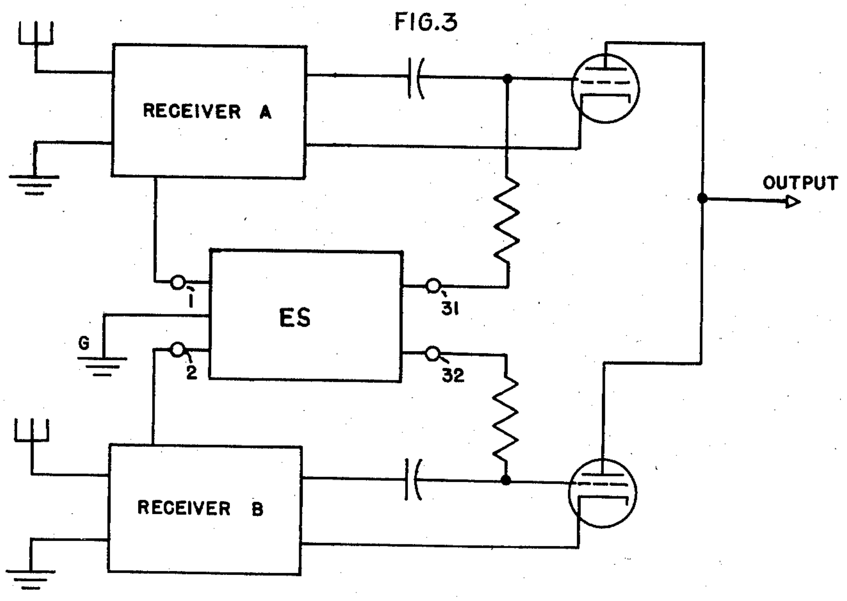
Figure 4:
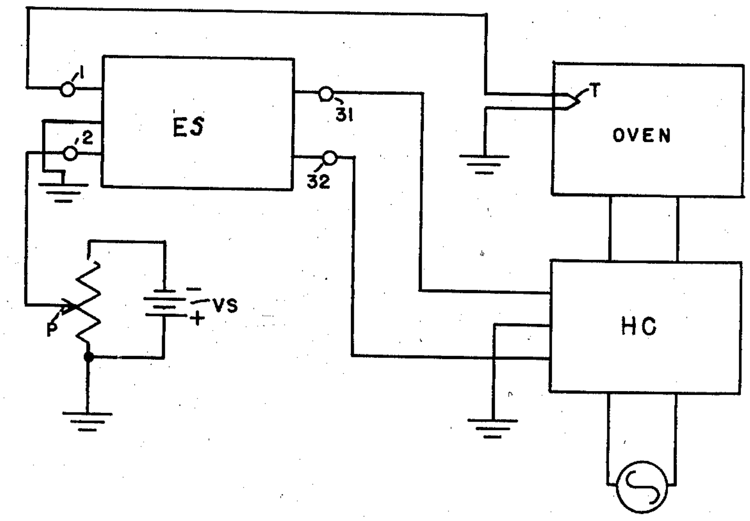

My invention is more completely described in the following specification which is accompanied with drawings of which Figure 1 shows one specific embodiments of my device wherein a negative voltage is generated proportionate to the least negative of two compared input voltages; Figure 2 is a modified embodiment which generates a fixed voltage in that one of two output channels corresponding to that one of two input channels having the least negative potential applied to it; Figure 3 is a block diagram showing the application of my device to diversity reception; and Figure 4 is a block diagram showing how the device is applied as a restoring control in a heating system.

Referring to Figure 1, pairs of terminals 1 and 2 are provided for the connection thereto of the two voltage sources to be compared, and are connected respectively to the control grids of tubes 3 and 4 which are shown as triodes, but which may be any type of grid controlled tube. The cathodes of tubes 3 and 4 are connected together and to ground G through potentiometer rheostat 5 and oscillator 46. Oscillator 46 provides a source of alternating energy the frequency of which is not critical and the purpose of which will presently become apparent. The anodes of tubes 3 and 4 are connected in push-pull fashion through center tapped primary 6 of coupling transformer 6—7, the center tap of which is connected to a source 45 of anode potential. Tubes 3 and 4 and the associated circuit constitute, in effect, a balanced modulator.

The secondary 7 of transformer 6—7 is connected at one end through coupling condensers 14 and 15 to the control grids of tubes 16 and 17 and connected at the other end to ground. The cathodes of tubes 16 and 17 are connected in push-pull relation to the ends of center tapped secondary 51 of coupling transformer 51—52 the primary of which is connected to oscillator 46. The center tap of secondary 51 is connected to a source of positive potential provided by the adjustable voltage divider 49—50 connected across anode potential source 45. The cathodes of tubes 16 and 17 are thus made positive with respect to ground and the grids are therefore negative with respect to the cathodes. The biasing potential is adjusted so that the tubes are substantially non-conducting on the negative crest of the oscillator potential applied to the cathodes. Tubes 16 and 17 and the associated circuit constitute, in effect, a second balanced modulator. The grids of tubes 16 and 17 are connected to ground through high resistors 47 and 48.

The anodes of tubes 16 and 17 are coupled to diodes 24 and 25 respectively through anode load resistors 18 and 19, coupling condensers 20 and 21 and diode cathode resistors 22 and 23 respectively. The anodes of the diodes are provided with load resistors 26 and 27, storage capacitors 29 and 30, and output terminals 31 and 32.

The operation of the device described is as follows: The output of tubes 3 and 4 in secondary 7 of transformer 6—7 is adjusted to zero for the desired value of the input potentials at terminals 1 and 2 by adjusting the tap on cathode potentiometer rheostat 5. For purposes of explanation if it is assumed that terminals 1 and 2 are connected to the automatic gain control networks of two receivers, it is obvious that if the receivers are energized by two unequal signals, the receiver receiving the weaker signal will have a negative potential in its automatic gain control network of less magnitude than the other receiver. Assuming that this weaker negative potential is applied to the grid of tube 3, this tube will have a higher conductivity than tube 4 and by virtue thereof the alternating energy from oscillator 46 applied to the cathodes will appear across secondary 7. The energy appearing in secondary 7 is applied to the grids of tubes 16 and 17 in parallel. This energy is derived from oscillator 46, and the cathodes of tubes 16 and 17 also vary in potential synchronously with the energy of oscillator 46 by the coupling through transformer 51—52, but since the cathode potentials are of opposing phase relation, the grid and cathode potentials of one of the tubes will add up to render the tube conducting and the potentials applied to the other tube will add up to render the tube less conducting or non-conducting. The 180 degree phase shift of the oscillator energy applied cophasally to the grids only of tubes 16 and 17 is determined as previously explained by which one of the two tubes 3 and 4 is rendered the most conducting by the application of the least negative or, that is to say, the most positive potential to its grid. If it is assumed that the phase relations are such that tube 16 is conducting, energy of the frequency of oscillator 46 will be applied across diode 24, but not across diode 25. Diode 24 will develop a negative potential across resistor-condenser network 26 and 29. This potential appearing at terminal 31 is the desired control potential. It is obvious that if input tube 4 were rendered more conducting than tube 3, the phase of the voltage supplied to the grids of tubes 16 and 17 would be reversed, and a negative potential would appear across resistor-condenser network 27, that is, between terminal 32 and ground but not between terminal 31 and ground. The negative potential may interchangeably appear at terminals 31 and 32 if the relative values of the input potentials at terminals 1 and 2 should interchange.

The final negative potential developed at terminals 31 and 32 may be used, for example, to bias to cut-off the audio channels of two receivers used in diversity reception to permit only the receiver actuated by the strongest signal to be heard as shown in Figure 3. The automatic gain control potential in receiver A is applied to input terminal 1 of the electronic switch ES and the automatic gain control potential of receiver B is applied to input terminal 2. The output potentials between terminal 31 and ground G and between terminal 32 and ground G are applied to grid controlled tubes in the audio circuits of the respective receivers. Thus, the audio channel of the receiver energized with the weaker signal will automatically be disabled. If the weaker signal gains in strength until it becomes the stronger of the two signals, the switching device will automatically reverse the switching of the audio channels.

Another example of an application of this embodiment is to temperature control as shown in Figure 4. Herein one of the input control voltages is that developed by a thermo-couple T situated in an oven. The other control voltage is a fixed negative voltage equal to that of the thermo-couple at the desired temperature. This latter voltage may be adjustable for different temperatures, as by means of a potentiometer P connected to a voltage source VS. If the oven temperature should change, the voltage developed by the thermo-couple will change correspondingly and an output potential will appear at terminals 31 and 32 in a direction corresponding to an increase or decrease of temperature, and if applied to the device HC for controlling the heating source in any manner well known in the art will act to restore the temperature to that for which the input potentials at terminals 1 and 2 are balanced.

It is considered desirable for some applications that the output control potential should not correspond in amplitude to the amount of unbalance between the input potentials at terminals 1 and 2 but, instead, that a potential of desired fixed amount should be obtained at either of two output terminals corresponding to an inequality of any degree of the potentials at the input terminals.

This purpose and others that will later become apparent are accomplished by the embodiment of Figure 2. Tubes 3 and 4, transformer 6—7, oscillator 46, tubes 16 and 17, rectifiers 24 and 25, and transformer 51—52 operate substantially as described for Figure 1. Interposed between tubes 3 and 4 and tubes 16 and 17 is a limiter stage comprising tubes 12 and 13 and resistances 9, 10 and 11 so biased as to reach plate saturation on low levels of input energy. Following the rectifier 24, I provide tube 33 having at least a cathode, a grid and an anode, and having the grid directly coupled to terminal 31. The cathode is positively biased by an adjustable tap on voltage divider 53 situated across the positive terminal of the power supply 45 and ground. Tube 34 is similarly arranged except that its grid is coupled to terminal 32. Anode load resistors 35 and 36 respectively connect the anodes to power supply 45. The anode current of tube 33 increases or decreases in accordance with the voltage applied to the grid from terminal 31. This results in a change in potential across the anode load resistor 35. The anode potential is applied to one side of gaseous discharge tube 37. The other or low side of tube 37 is connected through resistors 39 and 41 to the negative terminal of power supply 45. Similarly gaseous discharge tube 38 is arranged in the anode circuit of tube 34. Output terminals 42 and 43 are connected respectively to the low side of each of the gaseous discharge tubes.

Figure 2 is the preferred form of electronic switch for use in the diversity receiver system of Figure 3 while the circuit of Figure 1 is preferred for the control circuit of Figure 4.

The operation of this circuit is as follows: Assuming an unbalance in the potentials applied to input terminals 1 and 2 is in such a direction that tube 33 is conducting, the potential at the anode of tube 33 is reduced by the IR drop in resistor 35 and this potential is insufficient to fire gaseous discharge tube 37. Tube 34 at the same time will not be conducting, its anode potential will be that of the anode power supply and gaseous tube 38 will fire and conduct. Due to the voltage drop in resistor 40, the potential at terminal 43 will be less negative than the voltage at the junction of resistors 40 and 41, which is now the voltage at terminal 42 since there is no IR drop in resistor 39. Therefore, under the assumed conditions, terminal 42 will be highly negative and terminal 43 will not be highly negative. If the input conditions are reversed, the relative value of the output potentials will be reversed.

To eliminate the possibility of a small voltage change at terminals 1 and 2 leaving both neon tubes conducting, a regenerative latching circuit is incorporated. This circuit also greatly increases the sensitivity of the electronic switch as will presently become apparent. The regenerative latching circuit includes a connection from terminal 42 to the grid of tube 34 and through resistor 48 to the grid of tube 17. Terminal 43 is connected in similar fashion to the grid of tube 33 and through resistor 47 to the grid of tube 16. If it is assumed that the input potentials are such that tube 33 is not conducting, tube 37, as has been explained, will be conducting, and therefore terminal 42 will not be highly negative and this less negative or positive going potential is applied to the grid of tube 34 where it decreases the negative bias and causes tube 34 to draw still more current. This action decreases the potential across gaseous tube 38 still more, making certain that it is extinguished. This condition is reversed if the relative amplitudes of the potentials applied to input terminals 1 and 2 are reversed.

The sensitivity of the system is increased by the connections from the output terminals to the grids of tubes 16 and 17. Assuming that the input potentials are such that tube 16 is conducting, then tube 33 will not be conducting, gaseous tube 37 will be ignited and the potential at terminal 42 will be more positive than the potential at terminal 43. The less positive or more negative potential at terminal 43 being fed back to the grid of tube 16 renders it less sensitive, and the more positive potential at terminal 42 being fed back to tube 17 renders it more sensitive. Accordingly, only a small unbalance of potentials in the opposite direction on input terminals 1 and 2 will reverse the output potentials on terminals 42 and 43. The potential required to trigger tubes 16 and 17 can be made any practicable value by adjusting the cathode bias potential obtained from the voltage divider 49 and 50.

The electronic switch herein described can operate with great rapidity, being limited only by the ionization time of tubes 37 and 38.

It will be obvious that in the arrangements disclosed, it is not necessary that anode current be supplied to tubes 3, 4 and 16, 17 from the direct current source 45, but oscillator 46 may be the sole source of anode current. Other modifications will be obvious to those skilled in the art.

Having thus described my invention, what I claim is:

1. In a device of the character described, a first pair of tubes each having at least a grid, a cathode and an anode, two pairs of input terminals for the application thereto of two potentials to said grids, transformer means connecting said plates in push-pull, a tapped resistance connecting said cathodes, an oscillator, a connection for supplying to the tap on said resistor oscillator energy, a second pair of tubes each having at least a grid, a cathode and an anode, connections for supplying oscillator energy to said last mentioned cathodes in opposed phase relation, means coupling said last mentioned grids in parallel to said transformer means, and rectifier means coupled respectively to each of the last mentioned anodes, whereby one of said rectifiers will be energized with energy of the frequency of said oscillator corresponding to the input terminal impressed with the most positive potential.

2. In a device of the character described, a first pair of grid controlled tubes arranged as a balanced modulator, a second pair of grid controlled tubes coupled to said first pair of tubes and biased substantially to cut-off, a pair of rectifiers coupled one each to said second pair of tubes, a source of alternating potential connected to supply currents of the same phase to the plate circuits of said first pair of tubes and currents of opposing phase to the plate circuits of said second pair of tubes, whereby one of said rectifiers will operate to create a direct current potential upon the application of unequal potentials to the control grids of said first pair of tubes.

3. In a device of the character described, a first pair of grid controlled tubes each having at least a cathode, a grid and an anode, said anodes being connected in opposed relationship, a second pair of grid controlled tubes each having at least a cathode, a grid and an anode, said grids of said second pair of tubes being connected in phase and magnetically coupled to the opposed connected anodes of the first pair of tubes, a source of direct current potential normally biasing said second pair of tubes to cut-off, a source of alternating potential connected to apply voltages of the same phase to the cathodes of the first pair of tubes and voltages of opposite phase to the cathodes of said second pair of tubes, whereby an alternating potential of the frequency of said source will appear at the anode of one of said second pair of tubes upon the application of unequal potentials to the grids of said first pair of tubes.

4. In a device of the character described, a first pair of tubes having at least a cathode, a grid and an anode, a second pair of tubes each having a cathode, a grid and an anode, coupling means for coupling the anodes of said first pair of tubes in push-pull relationship to an output circuit, the grids of said second pair of tubes being connected in parallel to said output circuit, a source of direct current potential normally biasing said second pair of tubes to cut-off, a source of oscillations, means for injecting said oscillations cophasially into the cathode leads of the first pair of tubes and in opposing phase in the cathode leads of said second pair of tubes, whereby only one of said second pair of tubes will conduct at a time depending on which of said first tubes is more conducting than the other.

5. The device of claim 4 and including a rectifier coupled to the output of each of the second pair of tubes to provide a direct current control potential corresponding to that one of the first pair of tubes which is rendered more conducting by an input potential.

6. In the device of claim 5, energy limiter coupling means interposed between the anodes of said first pair of tubes and the grids of said second pair of tubes.

7. In the device of claim 6, a pair of triodes each adjusted initially to a conducting condition and each coupled to one of said rectifiers respectively, a load resistor connected in the anode circuit of each triode, and a gaseous discharge tube connected between the anode of each triode and the negative terminal of the source of anode current.

8. In the device of claim 7, a resistor connected between each gaseous discharge tube and the negative terminal of the source of anode current and an output terminal connected to the outer end of each said resistor, whereby the full negative potential will appear at the output terminal associated with the non-conducting gaseous discharge tube and a reduced negative potential will appear at the output terminal associated with the gaseous tube which is ignited, said two potentials being available for control purposes.

9. The device of claim 8, and including a connection between each output terminal and the grid of the opposite triode.

10. The device of claim 9, and including a high resistance connection from each output terminal to the grid of the opposite tube of the second pair of tubes.

11. A first balanced modulator having input terminals, a second balanced modulator, each of said modulators being formed of a pair of electron tubes each having cathode, grid and anode elements, a source of alternating potential connections from said source, for applying balanced alternating potential in like phase relation between the cathodes and ground in said first modulator and in unlike phase relation between the cathodes and ground in said second modulator, a source of direct current potential normally biasing said second modulator to cut-off, an output circuit for alternating current connected across the anode elements of said second modulator, and means for coupling said first modulator to said second modulator so that application of unequal potentials to the input terminals of said first modulator will unbalance said second modulator and cause the same to produce alternating current energy in said output circuit of the frequency of said source and of a phase relation determined by the direction of unbalance of the input potentials of said first modulator.

12. The device of claim 11 in which said second modulator is coupled to a divided rectifier network having output terminals, so that output potentials are developed corresponding in amplitude and direction to the amount and direction of the unbalancing potentials applied to the input terminals of said first modulator.

13. The device of claim 12 wherein a limiter is interposed between said first modulator and said second modulator, whereby the rectified potential depends only on the direction and not the amount of unbalance of said first modulator.

14. An electronic switching device comprising a first pair of tubes each having at least a grid, a cathode and a plate, a first transformer having a tapped primary and a unitary secondary, a second pair of tubes each having a grid, a cathode, and a plate, a ground, input terminals connected respectively to each of the grids of said first pair of tubes and to ground, a tapped resistor connecting the cathodes of the said first pair of tubes, the primary of said first transformer connecting the plates in opposition and to an anode current source, the secondary of the first transformer being coupled to the grids in parallel of said second pair of tubes, a second transformer having a primary and a tapped secondary, a source of alternating voltage, the secondary of said second transformer connecting the cathodes of said second pair of tubes in phase opposition and to a source of cut-off positive bias potential, the primary of said second transformer and the tap of said tapped resistor being connected to said source of alternating voltage, whereby an unbalance in plate currents of said first pair of tubes due to unequal input potentials applied to the grids will determine the phase of the alternating voltage applied cophasially to the grids of the second pair of tubes relative to the alternating voltage injected in opposition in the cathodes of said second pair of tubes, so that only one of said second pair of tubes will conduct at a time, depending upon which of said first tubes has the least negative input potential applied between its grid and ground bus terminals.

CHARLES L. JEFFERS.

REFERENCES CITED

The following references are of record in the file of this patent:

UNITED STATES PATENTS

| Number | Name | Date |
|---|---|---|
| 1,960,350 | Shackleton et al. | May 29, 1934 |
| 2,004,126 | Moore | June 11, 1935 |
| 2,179,265 | Luck | Nov. 7, 1939 |
| 2,391,532 | Wilmotte | Dec. 25, 1945 |
| 2,399,695 | Satterlee | May 7, 1946 |
| 2,418,284 | Winchell et al. | Apr. 1, 1947 |
| 2,432,422 | Hornfeck | Dec. 9, 1947 |
| 2,434,822 | Van Beuren et al. | Jan. 20, 1948 |
| 2,473,457 | Tyson | June 14, 1949 |